United States Patent [19]

Held

[11] Patent Number: 5,852,075
[45] Date of Patent: Dec. 22, 1998

[54] SURFACTANT SYSTEM FOR INK JET INKS FOR PRINTING ON HYDROPHOBIC SURFACES

[75] Inventor: Robert Paul Held, Newark, Del.

[73] Assignee: E. I. du Pont de Nemours and Company, Wilmington, Del.

[21] Appl. No.: 867,373

[22] Filed: Jun. 2, 1997

[51] Int. Cl.$^6$ .................................................. C08K 5/54
[52] U.S. Cl. ........................................................ 523/161
[58] Field of Search ............................................ 523/161

[56] References Cited

U.S. PATENT DOCUMENTS

| | | | |
|---|---|---|---|
| 4,176,361 | 11/1979 | Kawada | 346/1.1 |
| 4,399,443 | 8/1983 | Yasufuku et al. | 346/1.1 |
| 4,756,757 | 7/1988 | Haruta et al. | 106/20 |
| 4,762,865 | 8/1988 | Gold | 523/411 |
| 4,762,875 | 8/1988 | Gold | 524/248 |
| 4,792,357 | 12/1988 | Bier | 524/405 |
| 4,820,549 | 4/1989 | Ozaki | 427/98 |
| 4,935,461 | 6/1990 | Nakamura | 524/306 |
| 4,986,850 | 1/1991 | Iwata et al. | 106/25 |
| 5,169,437 | 12/1992 | You | 106/20 D |
| 5,172,133 | 12/1992 | Suga et al. | 346/1.1 |
| 5,190,582 | 3/1993 | Shinozuka et al. | 106/20 D |
| 5,211,747 | 5/1993 | Breton et al. | 106/20 R |
| 5,328,504 | 7/1994 | Ohnishi | 106/20 D |
| 5,344,872 | 9/1994 | Debord | 524/514 |
| 5,387,655 | 2/1995 | Aslin | 524/115 |
| 5,441,561 | 8/1995 | Chujo et al. | 106/20 C |
| 5,443,628 | 8/1995 | Loria et al. | 106/20 C |
| 5,447,562 | 9/1995 | Maeda et al. | 106/20 R |
| 5,462,592 | 10/1995 | Murakami | 106/22 |
| 5,470,904 | 11/1995 | Loftin et al. | 524/462 |
| 5,512,089 | 4/1996 | Thakkar | 106/20 R |
| 5,512,623 | 4/1996 | Loftin et al. | 524/462 |
| 5,538,548 | 7/1996 | Yamazaki | 106/20 C |
| 5,538,549 | 7/1996 | Kato et al. | 106/20 C |
| 5,542,969 | 8/1996 | Hirasa et al. | 106/20 C |
| 5,695,899 | 12/1997 | Kamada | 430/106 |

*Primary Examiner*—Paul R. Michl
*Attorney, Agent, or Firm*—Joseph A. Tessari

[57] ABSTRACT

An ink for ink jet printers containing an aqueous carrier medium; a colorant; and a mixture of at least one siloxane surfactant; and at least one fluorinated surfactant exhibits excellent wetting on hydrophobic surfaces.

10 Claims, No Drawings

SURFACTANT SYSTEM FOR INK JET INKS FOR PRINTING ON HYDROPHOBIC SURFACES

BACKGROUND OF THE INVENTION

This invention relates to aqueous inks for ink jet printers, and more particularly, to aqueous ink jet inks containing a mixture of surfactants to improve wetting of the ink on hydrophobic surfaces.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers. Both dyes and pigments have been used as ink colorants for ink jet printers. The dye-based inks while in general superior in color properties, have several disadvantages as compared to pigment based inks. The dyes are usually water soluble and remain so after drying on the substrate. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

In the graphic arts industry it is common to create graphics on hydrophobic surfaces such as vinyls by ink jet techniques which include piezoelectric and air brush printers. However, these vinyls contain contaminated surfaces wherein the contaminants consist of silicone oils, vinyl plasticizers, etc. Since water based inks have difficulty wetting these surfaces, solvent based inks are commonly used.

There exists a need for aqueous ink jet inks which have reduced surface tension and improved wetting out capabilities for printing onto contaminated hydrophobic surfaces that are commonly used for outdoor signs.

SUMMARY OF THE INVENTION

The present invention provides an ink jet ink composition comprising:
(a) an aqueous carrier medium;
(b) a colorant; and
(c) 2.5 to 6%, preferably 3 to 4.5% by weight, based on the total weight of the ink composition, of a mixture of surfactants consisting essentially of
 (i) at least one siloxane surfactant;
 (ii) at least one fluorinated surfactant of the formula:

[R(f)Q]A wherein
R(f) is a perfluoroalkyl group having 6 to 22 carbon atoms;
Q is a divalent bridging group;
A is a water soluble group; and
n is 1 or 2;
wherein the siloxane surfactant is present in the amount of 10 to 75%, preferably 25 to 65% by weight, based on the total weight of the surfactant mixture.

DETAILED DESCRIPTION OF THE EMBODIMENTS

The invention provides an ink jet ink composition which is particularly suited for use in ink jet printers in general, and piezoelectric and air brush ink jet printers in particular. Essentially, the ink composition comprises an aqueous carrier medium, a colorant and a mixture of specified surfactants, wherein the surfactants are present in a specified ratio in the ink composition. The inks may be adapted to the requirements of a particular ink jet printer to provide a balance of light stability, smear resistance, viscosity, surface tension, high optical density, and crust resistance.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 70 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

The colorant is either a dye or a pigment dispersion. The pigment dispersion comprises a pigment and a polymeric dispersant. By the term "dye" we mean a colorant that is soluble or becomes soluble at some point during the printing process. By "pigment" we mean a colorant that is insoluble (i.e., in particulate or crystalline form) throughout the printing process. Pigments are the preferred colorants for use in the compositions of this invention.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 1 to 15%, preferably approximately 1 to 8%, by weight of the total ink composition for most ink jet printing applications. If an inorganic pigment is selected, the ink will tend to contain higher weight percentages of the pigment than with comparable inks employing organic pigment, and may be as high as approximately 50% because inorganic pigments generally have higher specific gravities than the organic pigments.

Dispersant

Polymeric dispersants suitable for practicing the invention include random polymers and structured polymeric dispersants such as block copolymers and branched-type or graft polymers. The polymers may be anionic, cationic, or non-ionic in nature.

Random polymers are not as effective in stabilizing colorant dispersions as structured polymers and, therefore, are not preferred. However, a random polymer which has both hydrophilic sections for aqueous solubility and hydrophobic sections for interaction with the colorant and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (colorant binding) block for stronger specific interactions between the colorant and the polymer dispersant to give an improved dispersion stability. A detailed description of these polymers can be found in the aforementioned U.S. Pat. No. 5,085,698 and 5,272,201 and in EPO application 0 556 649 A1, published Aug. 25, 1993. Some useful graft polymers are disclosed in Assignee's U.S. Pat. No. 5,231,131.

The amount of the polymer depends on the structure, molecular weight and other properties of the polymer, and on the other components of the ink composition. The dispersant polymers that are selected in practicing the invention have number average molecular weight of below 40,000, preferably below 20,000, and typically in the range of 2,000 to 10,000.

The polymeric dispersant may be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Dyes

Dyes useful in this invention include anionic, cationic, amphoteric and non-ionic dyes. Disperse dyes which are water insoluble dyes are also useful in this invention. Such dyes are well known to those of ordinary skill in the art. Anionic dyes are those dyes which in aqueous solution yield colored anions and cationic dyes are those which in aqueous solution yield colored cations. Typically anionic dyes contain carboxylic or sulfonic acid groups as the ionic moiety. Cationic dyes usually contain quaternary nitrogen groups.

Amphoteric dyes may be anionic, cationic or have both charges as a function of solution pH. Certain non-ionic dyes have sufficient water solubility to be used in aqueous inks. Dyes with poor solubility in the aqueous carrier medium are treated as pigments and may be dispersed for use in aqueous inks in the same manner as discussed below.

All types of dyes mentioned above are typically classified by their end use. Some of the more useful classes of dyes in this invention are Acid, Basic, Direct, Food, Disperse, Mordant, Vat, Solvent and Reactive dyes. Any of these classes of dyes may have one or more distinct functional groups such as nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds, diphenylmethane compounds, acridine compounds, quinoline compounds, methine or polymethine compounds, indamine or indophenyl compounds, among others, all of which are well known to those skilled in the art.

The color and amount of dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The dye is present in the amount of 0.01 to 20%, by weight, preferably 0.05 to 8%, by weight, more preferably 0.1 to 5%, by weight, based on the total weight of the ink.

Surfactant Mixture

The inks of the invention comprise a mixture of surfactants consisting essentially of (i) at least one siloxane surfactant; and (ii) at least one fluorinated surfactant. The surfactant mixture is present in the amount of 2.5 to 6% by weight, preferably 3.0 to 4.5 by weight, based on the total weight of the ink composition.

Siloxane Surfactant

The siloxane surfactant is selected from the group consisting of:

(i) a polyether modified siloxane of the formula:

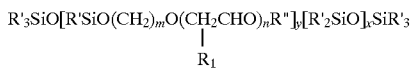

wherein R'=methyl

R"=hydrocarbon chain, and $R_1$=H for ethylene oxide, $CH_3$ for propylene oxide.

Polyether modification of polysiloxanes can be done by modification of the silicone backbone structure through the introduction of side chains. Through the introduction of various types and number of side chains, compatibility can be improved or modified. The relationship or proportion of dimethyl groups to polyether modification (x to y, in the structure diagram) allows the control of the degree of compatibility. This has an influence on surface tension. The polyether chain can be ethylene oxide (EO) and/or propylene oxide (PO). PEO is very hydrophilic, whereas PPO is hydrophobic; control of the ratios of PEO to PPO can control the degree of polarity of the entire silicone additive.

(ii) a nonionic siloxane polyoxyalkylene copolymer comprising a siloxane polymer and at least one oxyalkylene polymer, wherein the at least one oxyalkylene polymer comprises from 5% to 95% by weight of the entire copolymer. The copolymers have the general formula:

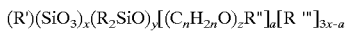

wherein R' is a hydrocarbon radical having a valence of x,
R and R" are monovalent hydrocarbon radicals,
R'" is a member of the group consisting of alkyl radicals and $R_2Si$-radicals,
x is an integer having a value of at least 1,
y is an integer having a value of at least 3,
n is an integer having a value of 2 to 4,
a is an integer having a value of at least one and not greater than 3x, and
z is an integer having a value of at least 2.

Generally the siloxane has a weight average molecular weight from about 500 to 10,000, and each of the at least one oxyalkylene polymer(s) has a weight average molecular weight from about 500 to 6,000.

Compounds (ii) above are disclosed in Bailey and O'Connor U.S. Pat. No. 2,834,748, the disclosures of which are incorporated by reference.

Preferred nonionic siloxane polyoxyalkylene copolymers are a mixture of copolymers wherein each copolymer contains a siloxane polymer and three oxyalkylene polymers in combination and have the general formula:

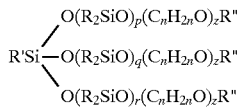

wherein R, R' and R" are monovalent hydrocarbon radicals,
p, q, and r are integers each having a value of at least 1,
n is an integer having a value of 2 to 4, and
z is an integer having a value of at least 2.

Particularly preferred compounds of type (ii) are of the formula:

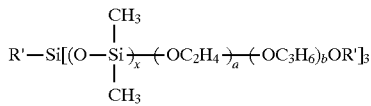

wherein R' is alkyl radicals of 1 to 4 carbon atoms,
x is 4 to 60,
a+b=1 to x, and
a≧b.

(iii) block copolymers composed of:
(1) at least one siloxane represented by the formula:

wherein R contains from 1 to 22 carbon atoms and is selected from the class consisting of monovalent hydrocarbon groups and divalent hydrocarbon groups, and
b=1 to 3; said siloxane block containing at least one of said siloxane units wherein at least one R group is a divalent hydrocarbon group, and (2) at least one oxyalkylene block containing at least two oxyalkylene groups represented by the formula:

wherein R' is an alkylene group containing from 2–10 carbon atoms, and wherein the siloxane and oxyalkylene blocks are connected by the divalent hydrocarbon group.

Compounds (iii) above are disclosed in Huntington U.S. Pat. No. 3,305,504, the disclosures of which are incorporated by reference.

Particularly preferred compounds of type (iii) are of the formula:

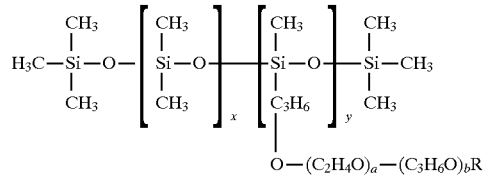

wherein R is hydrogen or alkyl radical of 1 to 4 carbon atoms,
a is 1 to 30,
b is 0 to 30,
x+y=4 to 60 where x≧y and y≧1.

Suitable siloxane surfactants are available from BYK-Chemie, Wallingford, Conn., as BYK surfactants and from Union Carbide Corp., Danbury, Conn. as Silwet® surfactants.

Preferred siloxane surfactants include polyether modified dimethyl siloxane and nonionic silicone glycol copolymers.

The siloxane surfactant is present in the amount of 10 to 75%, preferably 25 to 65%, and more preferably 30 to 60% by weight, based on the total weight of the surfactant mixture. One or more of the siloxane surfactants can be mixed together prior to their use as long as they form a single phase liquid.

Fluorinated Surfactant

The fluorinated surfactant of the invention has the formula:

wherein, R(f) is a perfluoroalkyl group having 6 to 22 carbon atoms; Q is a divalent bridging group; A is a water soluble group; and n is 1 or 2. The bridging Q group may be a diradical of alkyl, aralkyl, alkylaryl, or aryl containing less than 10 carbon atoms, and may contain heteroatoms such as S, O, and N. The linkage between the bridging Q group and the water-soluble A group may be ether, ester, amide, or sulfoamido provided it is stable under the conditions of use. The water-soluble A group may be selected from —$(OCH_2CH_2)_xOH$ wherein x is 1 to 12; —COOM and —$SO_3M$ wherein M is hydrogen, ammonium, amine, or an alkali metal such as lithium, sodium, or potassium; —$PO_4(Z)_y$ wherein y is 1–2 and Z is hydrogen, ammonium, amine, or an alkali metal such as lithium, sodium, or potassium; —$NR_3X$ wherein $R_3$ is an alkyl group of 1 to 4 carbon atoms and X is an anionic counterion selected from the group consisting of halides, acetates, and sulfonates, and other water-soluble zwitterionic groups. Preferably, the water soluble group is an ethylene oxide group no greater than 8 to 9 monomer units, because the larger units are less effective. The balance between the size of the perfluoroalkyl group and the water-soluble group should be such that the surfactant as a whole has a solubility in the desired aqueous carrier medium of at least 0.01% at 25° C., preferably at least 0.05% at 25° C.

Suitable fluorinated surfactants are commercially available from E. I. du Pont de Nemours and Company (Wilmington, Del.) as Zonyl®, and from 3M Company (Minneapolis, Minn.) as Fluorad®, which may be used alone or in combinations. The specific surfactant(s) selected will vary with other components in the ink and the properties of the ink printed adjacent to it. It is important that the ionic character of the selected fluorinated surfactant be compatible with other components in the inks to avoid precipitation or flocculation.

Some examples of suitable fluorinated surfactants are shown in Table 1:

TABLE 1

| FLUORINATED SURFACTANT | R(f) | Q | A | n |
|---|---|---|---|---|
| 1 | $F(CF_2CF_2)_{3-8}$ | $CH_2CH_2SCH_2CH_2$ | $CO_2Li^a$ | 1 |
| 2 | $F(CF_2CF_2)_{3-8}$ | $CH_2CH_2$ | $PO_4(NH_4)_2$ | 1 |
| 3 | $F(CF_2CF_2)_{3-8}$ | $CH_2CH_2$ | $PO_4NH_4$ | 2 |
| 4 | $F(CF_2CF_2)_{3-8}$ | $CH_2CH_2$ | $(OCH_2CH_2)_xOH^b$ | |

$^a$Counter ions other than lithium and ammonium are also useful
$^b$x is 1–10

The fluorinated surfactant may be present in the amount of 22 to 85% by weight, preferably 43 to 71% by weight, and most preferably 45 to 55% by weight, based on total weight of the surfactant mixture to effectively wet the hydrophobic surface to be printed. The selected concentration will vary with the ink system, efficiency of the fluorinated surfactant, properties of companion ink(s), and the intended media. Generally, sufficient fluorinated surfactant will be added to provide adequate wetting of hydrophobic media surfaces.

Preferred fluorinated surfactants include fluoroalkyl alcohol substituted monoether with polyethylene glycol and telomer B monoether with polyethylene glycol.

The mixture of surfactants is present in the amount of 2.5 to 6%, preferably 3.0 to 4.5% by weight, based on the total weight of the ink composition. The surfactants in the mixture are chosen such that the mixture provides sufficient wetting of hydrophobic surfaces.

Other Ingredients

Consistent with the requirements of the invention, various types of additives may be used to optimize the properties of the ink compositions for specific applications. As is well known to those skilled in the art, biocides may be used in the ink compositions to inhibit growth of microorganisms. Sequestering agents such as EDTA may also be included to eliminate deleterious effects of heavy metal impurities. Other known additives, such as humectants, coalescents, viscosity modifiers and other acrylic or non-acrylic polymers may also be added to improve various properties of the ink compositions as desired.

Ink Preparation

The inks are prepared by premixing the selected insoluble colorants such as pigments and dispersant in the aqueous carrier medium and then dispersing or deflocculating the colorant. This step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the colorant in the aqueous carrier medium.

If a dye is used as the colorant, there is no dispersant present and no need for pigment deaggregation. The dye-based ink is prepared in a well agitated vessel rather than in dispersing equipment.

It is generally desirable to make ink jet inks in concentrated form to maximize the efficiency of the manufacturing process and equipment. The concentrated ink jet inks are subsequently diluted to the appropriate concentration for use in the ink jet printing system by adding water and/or appropriate solvents. By dilution, the ink is adjusted to the desired viscosity, color, hue, saturation density, and print area coverage for the particular application.

Ink Properties

Jet velocity, separation length of the droplets, drop size, and stream stability are greatly affected by the surface tension and the viscosity of the ink. Pigmented ink jet inks suitable for use with ink jet printing systems should have a surface tension in the range of about 15 dyne/cm to about 70 dyne/cm and preferably in the range 15 dyne/cm to about 35 dyne/cm. Acceptable viscosities are no greater than 20 cP, and preferably in the range of about 1.0 cP to about 15.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, air brush and valve jet printers. The inks have excellent storage stability for a long period and do not clog in an ink jet apparatus. Fixing the ink on the image recording material, such as, paper, fabric, film, etc., can be carried out rapidly and accurately by application of heat to coalesce the polymer latex.

EXAMPLES

The invention will now be further illustrated by, but not limited to, the following examples, in which parts and percentages are by weight unless otherwise noted.

Polymer Preparation 1

This shows the preparation of BZMA//MAA 13//10 block copolymer.

A 12-liter flask was equipped with a mechanical stirrer, thermometer, N2 inlet, drying tube outlet, and addition funnels. Tetrahydrofuran THF, 3750 gm, and p-xylene, 7.4 gm, were charged to the flask. The catalyst tetrabutyl ammonium m-chlorobenzoate, 3.0 ml of a 1.0M solution in acetonitrile, was then added. Initiator, 1,1-bis (trimethylsiloxy)-2-methyl propene, 291.1 gm (1.25M) was injected. Feed I [tetrabutyl ammonium m-chlorobenzoate, 3.0 ml of a 1.0M solution in acetonitrile] was started and added over 180 minutes. Feed II [trimethylsilyl methacrylate, 1975 gm (12.5M)] was started at 0.0 minutes and added over 35 minutes. One hundred minutes after Feed II was completed (over 99% of the monomers had reacted) Feed III [benzyl methacrylate, 2860 gm (16.3M) was started and added over 30 minutes.

At 400 minutes, 720 gm of methanol were added to the above solution and distillation begun. During the, first stage of distillation, 1764.0 gm of material were removed. Then more methanol 304.0 gm was added and an additional 2255.0 gm of material were distilled out. It was at 49.7% solids.

The polymer has a composition of BZMA//MAA 13//10. It has a molecular weight of Mn=2966.

Polymer Preparation 2

This shows the preparation of butyl methacrylate/methyl methacrylate//methacrylic acid AB block polymer (10/5//10) block copolymer.

A 12-liter flask was equipped with a stirrer, thermometer, N2 inlet, drying tube outlet and addition funnels. Tetrahydrofuran ("THF"), 3027 g, and p-xylene, 6.2 g were charged to the flask. The catalyst, tetrabutyl ammonium m-chlorobenzoate, 2.5 ml of a 1.0M solution in acetonitrile, was then added. The initiator, 1,1-bis(trimethylsiloxy)-2-methylpropene, 234.4 g, was injected. Feed I (tetrabutyl ammonium m-chlorobenzoate, 2.5 ml of a 1.0M solution in acetonitrile) was started and added over 150 minutes. Feed II (trimethylsilyl methacrylate, 1580 g) was started at 0.0 min and added over 30 minutes. One hundred and twenty minutes after Feed II was completed, Feed III (butyl methacrylate, 1425 g and methyl methacrylate, 503 g) was started and added over 30 minutes. At 320 minutes, 650 g of dry methanol were added to the above solution and distillation was started. During the first stage of distillation 1250.0 g of material were removed from the flask. I-propoanol, 1182 g, was added. Distillation continued and a total of 2792 g of solvent were removed.

This made a butyl methacrylate/methyl methacrylate//methacrylic acid AB block polymer (10/5//10) with a Mn=2780.

Black Pigment Dispersion Concentrate

A black pigment dispersion was prepared by mixing together 100 grams of Polymer 2; 200 grams of FW-18 pigment (Degussa Corp., Allendale, N.J.) and 200 grams of diethylene glycol. The premixture was then charged to a two roll mill (Model XJF-S2637 Adalet Manufacturing Co., Cleveland Ohio) and processed for 45 minutes. The temperature of one roll was held at 150° C. and the other roll was approximately 10° C. cooler. This made a pigment dispersion that contained 50% pigment, 25% polymer (P/D ratio=2/1) and 25% diethylene glycol.

An aqueous pigment concentrate using 2-dimethylaminoethanol as the neutralizing agent was then prepared by mixing 1200 grams of pigment dispersion prepared above with 96.2 grams of 2-dimethylaminoethanol and 2704 grams of deionized water with stirring. The resulting pigment concentrate contained 15% pigment.

Yellow Pigment Dispersion Concentrate

A yellow pigment dispersion was prepared by mixing together 305.4 grams of Polymer 1; 183.3 grams of Y-128 pigment (Diazo Yellow 8GN from Ciba) and 64 grams of diethylene glycol. The premixture was then charged to a two roll mill (Model XJF-S2637 Adalet Manufacturing Co., Cleveland Ohio) and processed for 45 minutes. The temperature of one roll was held at 150° C. and the other roll was approximately 10° C. cooler. This made a pigment dispersion that contained 45.82% pigment, 38.18% polymer (P/D ratio=1.2/1) and 16% diethylene glycol.

An aqueous pigment concentrate using 2-dimethylaminoethanol as the neutralizing agent was then prepared by mixing 1809.9 grams of pigment dispersion prepared above with 217 grams of 2-dimethylaminoethanol and 1973.1 grams of deionized water with stirring. The resulting pigment concentrate contained 15% pigment.

Magenta Pigment Dispersion Concentrate

A magenta pigment dispersion was prepared by mixing together 272 grams of Polymer 1; 204 grams of PR-122 pigment (Quindo Magenta 122, BASF) and 66 grams of diethylene glycol. The premixture was then charged to a two roll mill (Model XJF-S2637 Adalet Manufacturing Co., Cleveland Ohio) and processed for 45 minutes. The temperature of one roll was held at 150° C. and the other roll was approximately 10° C. cooler. This made a pigment dispersion that contained 51% pigment, 34% polymer (P/D ratio=1.5/1) and 15% diethylene glycol.

An aqueous pigment concentrate using 2-dimethylaminoethanol as the neutralizing agent was then prepared by mixing 1809.9 grams of pigment dispersion prepared above with 217 grams of 2-dimethylaminoethanol and 1973.1 grams of deionized water with stirring. The resulting pigment concentrate contained 15% pigment.

Cyan Pigment Dispersion Concentrate

A cyan pigment dispersion was prepared by mixing together 144 grams of Polymer 1; 216 grams of PB 15:3 pigment (Endurophthal Blue GF BT-617-D) and 40 grams of diethylene glycol. The premixture was then charged to a two roll mill (Model XJF-S2637 Adalet Manufacturing Co., Cleveland Ohio) and processed for 45 minutes. The temperature of one roll was held at 150° C. and the other roll was approximately 10° C. cooler. This made a pigment dispersion that contained 54% pigment, 36% polymer (P/D ratio=1.5/1) and 10% diethylene glycol.

An aqueous pigment concentrate using 2-dimethylaminoethanol as the neutralizing agent was then prepared by mixing 1809.9 grams of pigment dispersion prepared above with 217 grams of 2-dimethylaminoethanol and 1973.1 grams of deionized water with stirring. The resulting pigment concentrate contained 15% pigment.

Ink Preparation 1:
Inks were prepared by stirring together the following ingredients:

| Ingredient | Amount (% by weight) | | | |
| --- | --- | --- | --- | --- |
| | Sample 1 | Sample 2 | Sample 3 | Sample 4 |
| Magenta Pigment Dispersion Concentrate | 30 | 30 | 30 | 30 |
| Emulsion Polymer E1691, Rohm & Haas | 9 | 9 | 9 | 9 |
| Telomer B monoether with polyethylene glycol | 0 | 2 | 2 | 1 |
| Polyether modified dimethyl polysiloxane | 2 | 0 | 2 | 1 |
| Deionized water | 59 | 59 | 57 | 59 |

Ink Preparation 2:
Inks were prepared by stirring together the following ingredients:

| Ingredient | Amount (% by weight) | | | | |
| --- | --- | --- | --- | --- | --- |
| | Sample 1 | Sample 2 | Sample 3 | Sample 4 | Sample 5 |
| Magenta Pigment Dispersion Concentrate | 30 | 30 | 30 | 30 | 30 |
| Emulsion Polymer E1691, Rohm & Haas | 9 | 9 | 9 | 9 | 9 |
| Fluoroalkyl alcohol substituted mono ether with polyethylene glycol | 2 | 0 | 2 | 1 | 2 |
| Polyether modified dimethyl polysiloxane | 0 | 2 | 2 | 1 | 1.5 |
| Deionized water | 59 | 61 | 61 | 61 | 61.5 |

Ink Preparation 3:
Inks were prepared by stirring together the following ingredients:

| Ingredient | Amount (% by weight) | | |
| --- | --- | --- | --- |
| | Sample 1 | Sample 2 | Sample 3 |
| Cyan Pigment Dispersion Concentrate | 20 | — | — |
| Yellow Pigment Dispersion Concentrate | — | 30 | — |
| Black Pigment Dispersion Concentrate | — | — | 30 |
| Emulsion Polymer E1691, Rohm & Haas | 18 | 18 | 18 |
| Tetomer B mono ether with polyethylene glycol | 2 | 2 | 2 |
| Polyether modified dimethyl polysiloxane | 1.5 | 1.5 | 1.5 |
| Deionized water | 58.5 | 48.5 | 48.5 |

Ink Preparation 4:
Inks were prepared by stirring together the following ingredients:

| Ingredient | Amount (% by weight) | | | |
| --- | --- | --- | --- | --- |
| | Sample 1 | Sample 2 | Sample 3 | Sample 4 |
| Magenta Pigment Dispersion Concentrate | 30 | 30 | 30 | 30 |
| Emulsion Polymer E1691, Rohm & Haas | 9 | 9 | 9 | 9 |
| Telomer B monoether with polyethylene glycol | 2 | 0 | 2 | 1 |
| Silwet ® L77, Union Carbide Corp., Danbury, CT | 0 | 2 | 2 | 1 |
| Deionized water | 59 | 59 | 57 | 59 |

Ink Preparation 5:
A magenta ink was prepared by mixing together the following ingredients.

| Ingredient | Amount (% by weight) |
| --- | --- |
| Magenta Pigment Dispersion Concentrate | 26.67 |
| BYK-345 (polysiloxane surfactant) | 1.5 |
| Zonyl FSO-100 (fluorocarbon surfactant) | 2.0 |
| N-methylpyrrolidone | 30 |
| Deionized water | 39.83 |

Example 1

Ink samples 1 to 4 from Ink Preparation 1 were applied, in a thin uniform coating approximately 1–5 microns thick, to the surface of an adhesive backed vinyl sheet (Meyercord, Marking Films Division, Carolstream, Ill.) by air brush spraying using a Badger Model 200 air brush sprayer (Badger Air Brush Co.,Franklin Park, Ill.). The samples were observed for wetting characteristics of the ink film on the surface of the vinyl sheet. Ink films made from Inks 1 and 2 did not wet the vinyl surface adequately which is shown by a non-uniform film caused by film coalescence or non-wetting. The ink film from Ink 4 showed marginal to very poor wetting of the vinyl surface. Ink sample 3 gave adequate wetting of the vinyl surface as shown by good film formation.

Example 2

Ink samples 1 to 5 from Ink Preparation 2 were applied to a vinyl surface by air brush spraying as described in Example 1. The samples were observed for wetting characteristics of the ink film on the surface of the final sheet. Ink films made from Inks 1 and 2 did not wet the vinyl surface adequately as shown by film coalescence or non-wetting. The ink film from Ink 4 was very poor and marginal at best. Ink samples 3 and 5 gave adequate wetting of the vinyl surface as shown by good film formation.

Example 3

Ink samples 1 to 3 from Ink Preparation 3 were applied to a vinyl surface by air brush spraying as described in Example 1. The samples were observed for wetting characteristics of the ink film on the surface of the final sheet. All ink films wet the vinyl surface to provide a uniform film.

Example 4

Ink samples 1 to 4 from Ink Preparation 4 were applied to a vinyl surface by air brush spraying as described in Example 1. The samples were observed for wetting characteristics of the ink film on the surface of the final sheet. Ink films made from Inks 1, 2 and 4 did not wet the vinyl surface adequately as shown by film coalescence or non-wetting. Ink sample 3 gave adequate wetting of the vinyl surface as shown by good film formation.

Example 5

Ink Preparation 5 was applied to a vinyl surface by air brush spraying as in Example 1. The ink gave good wetting of the vinyl surface as shown by good film formation.

What is claimed is:

1. An ink jet ink composition comprising:
   (a) an aqueous carrier medium;
   (b) a colorant comprising a pigment and a polymeric dispersant; and
   (c) 2.5 to 6%, based on the total weight of the ink composition, of a mixture of surfactants consisting essentially of
      (i) at least one siloxane surfactant selected from the group consisting of
         (1) a polyether modified siloxane of the formula:

$R'_3SiO[R'SiO(CH_2)_mO(CH_2CHO)_nR'']_b[R'_2SiO]_xSiR'_3$
         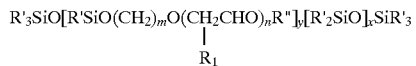

wherein R'=methyl; R''=hydrocarbon chain and $R_1$=H for ethylene oxide, $CH_3$ for propylene oxide
         (2) a nonionic siloxane polyoxyalkylene copolymer, wherein each copolymer contains a siloxane polymer and at least one oxyalkylene polymer, comprising from 5% to 95% by weight of the block copolymer and having the general formula:

$(R')(SiO_3)_x(R_2SiO)_y[(C_nH_{2n}O)_zR'']_a[R''']_{3x-a}$ wherein R' is a hydrocarbon radical having a valence of x; R and R'' are monovalent hydrocarbon radicals, R''' is a member of the group consisting of alkyl radicals and $R_2Si$-radicals; $x \geq 1$; $y \geq 3$; $n=2-4$; $1 \geq a \leq 3x$ and $z \geq 2$, and (3) block copolymers composed of:
      (A) at least one siloxane unit represented by the formula:

$R_bSiO_{(4-b)}$ 

wherein R contains from one to about twenty-two carbon atoms inclusive and is selected from the class consisting of monovalent hydrocarbon groups and divalent hydrocarbon groups, and b has a value from 1 to 3 inclusive; said siloxane block containing at least one of said siloxane units wherein at least one R group is a divalent hydrocarbon group and
      (B) at least one oxyalkylene block containing at least two oxyalkylene groups represented by the formula:

—R'O— 

wherein R' is an alkylene group containing from 2 to about 10 carbon atoms inclusive said siloxane and oxyalkylene blocks being interconnected by said divalent hydrocarbon group;
   (ii) at least one fluorinated surfactant of the formula:

$[R(f)Q]_nA$ 

wherein, R(f) is $F(CF_2CF_2)_{3-8}$; Q is selected from the group consisting of $CH_2CH_2SCH_2CH_2$ and $CH_2CH_2$; A is a water soluble group selected from the group consisting of $CO_2A$; $PO_4(A)_2$; $PO_4A$ and $(OCH_2CH_2)_xOH$, where A is a counterion and x is 1-10; and n is 1 or 2;
   (iii) wherein the at least one siloxane surfactant is present in the amount of 15 to 75% by weight, based on the total weight of the surfactant mixture.

2. The inkjet ink composition of claim 1 wherein the mixture of surfactants is present in the amount of 3 to 4.5% by weight, based on the total weight of the ink composition.

3. The ink jet ink composition of claim 1 wherein the siloxane surfactant is a nonionic siloxane polyoxyalkylene copolymer comprising a mixture of block copolymers wherein each copolymer contains a siloxane polymer and three oxyalkylene polymers in combination, and wherein each copolymer has the general formula:

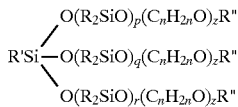

wherein R, R' and R'' are monovalent hydrocarbon radicals, p, q, and r are integers each having a value of at least 1,
n=2 to 4, and
z≥2.

4. The ink jet ink composition of claim 1 wherein the siloxane surfactant has the formula:

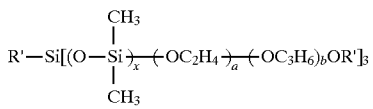

wherein R' is alkyl radicals of 1 to 4 carbon atoms,
x is 4 to 60,
a+b=1 to x, and
a≥b.

5. The ink jet ink composition of claim 1 wherein the siloxane surfactant has the formula:

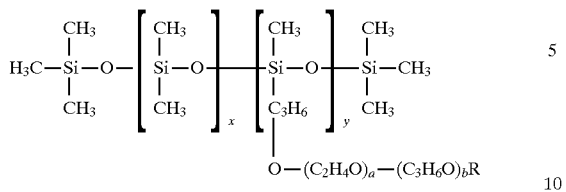

wherein R is hydrogen or alkyl radical of 1 to 4 carbon atoms, a is 1 to 30, b is 0 to 30, x+y=4 to 60 where $x \geq y$ and $y \geq 1$.

6. The ink jet ink composition of claim 1 wherein the surfactant mixture comprises 45 to 55% by weight siloxane surfactant.

7. The ink jet ink composition of claim 1 wherein the fluorinated surfactant has a solubility, in the aqueous carrier medium, of at least 0.01% at 25° C.

8. The inkjet ink composition of claim 1 wherein the fluorinated surfactant is telomer B monoether with polyethylene glycol.

9. The ink jet ink composition of claim 1 wherein the fluorinated surfactant is a fluoroalkyl alcohol substituted monoether with polyethylene glycol.

10. A process of printing an image on an untreated hydrophobic substrate comprising the step of ejecting an ink jet ink composition from an air brush sprayer onto a hydrophobic substrate, wherein said ink jet ink composition comprises:

(a) an aqueous carrier medium;

(b) a colorant comprising a pigment and a polymeric dispersant; and (c) 2.5 to 6%, based on the total weight of the ink composition, of a mixture of surfactants consisting essentially of (i) at least one siloxane surfactant selected from the group consisting of (1) a polyether modified siloxane of the formula:

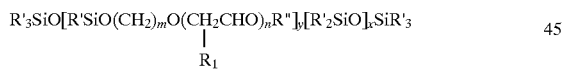

wherein R'=methyl; R"=hydrocarbon chain, and $R_1$=H for ethylene oxide, $CH_3$ for propylene oxide (2) a nonionic siloxane polyoxyalkylene copolymer, wherein each copolymer contains a siloxane polymer and at least one oxyalkylene polymer, comprising from 5% to 95% by weight of the block copolymer and having the general formula:

$(R')(SiO_3)_x(R_2SiO)_y[(C_nH_{2n}O)_zR'']_a[R''']_{3x-a}$ wherein R' is a hydrocarbon radical having a valence of x; R and R" are monovalent hydrocarbon radicals, R'" is a member of the group consisting of alkyl radicals and $R_2Si$-radicals; $x \geq 1$; $y \geq 3$; n=2-4; $1 \leq a \leq 3x$, and $z \geq 2$; and (3) block copolymers composed of:

(A) at least one siloxane unit represented by the formula:

$R_bSiO_{(4-b)}$ wherein R contains from one to about twenty-two carbon atoms inclusive and is selected from the class consisting of monovalent hydrocarbon groups and divalent hydrocarbon groups, and b has a value from 1 to 3 inclusive; said siloxane block containing at least one of said siloxane units wherein at least one R group is a divalent hydrocarbon group, and (B) at least one oxyalkylene block containing at least two oxyalkylene groups represented by the formula:

—R'O— wherein R' is an alkylene group containing from 2 to about 10 carbon atoms inclusive, said siloxane and oxyalkylene blocks being interconnected by said divalent hydrocarbon group;

(ii) at least one fluorinated surfactant of the formula:

$[R(f)Q]_nA$ wherein, R(f) is $F(CF_2CF_2)_{3-8}$; Q is selected from the group consisting of $CH_2CH_2SCH_2CH_2$ and $CH_2CH_2$; A is a water soluble group selected from the group consisting of $CO_2A$; $PO_4(A)_2$; $PO_4A$; and $(OCH_2CH_2)_xOH$, where A is a counterion and x is 1-10; and n is 1 or 2;

(iii) wherein the at least one siloxane surfactant is present in the amount of 15 to 75% by weight, based on the total weight of the surfactant mixture.

* * * * *

UNITED STATES PATENT AND TRADEMARK OFFICE
CERTIFICATE OF CORRECTION

PATENT NO. : 5,852,075
DATED : December 22, 1998
INVENTOR(S) : Robert Paul Held

It is certified that error appears in the above-identified patent and that said Letters Patent is hereby corrected as shown below:

Claim 1, Column 13, line 67, delete -- $1 \geq a \leq 3x,$ -- and substitute therefor "$1 \leq a \geq 3x,$".

Claim 4, Column 14, line 60, delete

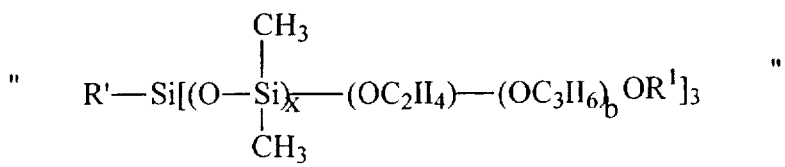

and substitute therefor

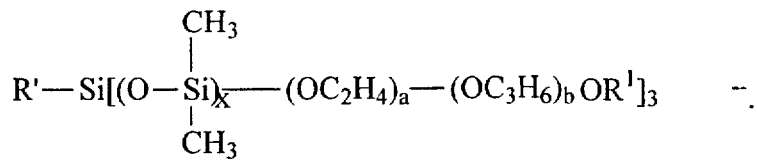

UNITED STATES PATENT AND TRADEMARK OFFICE
CERTIFICATE OF CORRECTION

PATENT NO. : 5,852,075
DATED : December 22, 1998
INVENTOR(S) : Robert Paul Held

It is certified that error appears in the above-identified patent and that said Letters Patent is hereby corrected as shown below:

In Claim 5, Column 15, delete

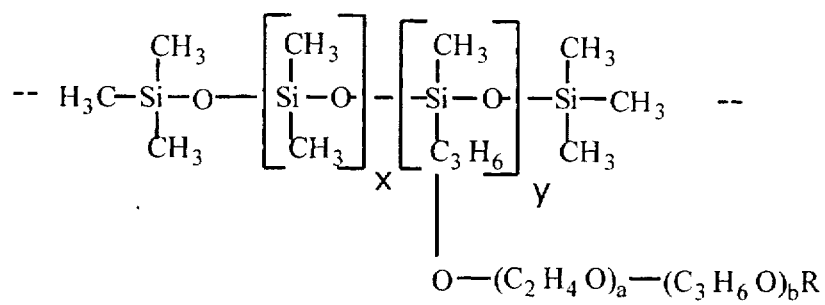

and substitute therefor

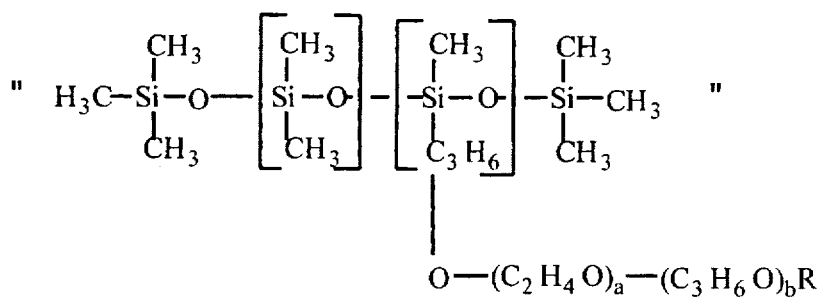

UNITED STATES PATENT AND TRADEMARK OFFICE
CERTIFICATE OF CORRECTION

PATENT NO. : 5,852,075
DATED : December 22, 1998
INVENTOR(S) : Robert Paul Held

It is certified that error appears in the above-identified patent and that said Letters Patent is hereby corrected as shown below:

Claim 10, Column 16, line 5, delete "$(R')(SiO_3)_x(R_2SiO)_y[(C_nH_{2n}O)_zR'']_a[R''']_{3x\ a}$" and substitute therefor -- $(R')(SiO_3)_x(R_2SiO)_y[(C_nH_{2n}O)_zR'']_a[R''']_{3x-a}$ --

Signed and Sealed this

Fourteenth Day of December, 1999

Attest:

Q. TODD DICKINSON

*Attesting Officer*    *Acting Commissioner of Patents and Trademarks*